SIGNAL PROCESSING SYSTEM AND METHOD

Filed June 30, 1960 2 Sheets-Sheet 1

INVENTOR.
WILLIAM G. EHRICH

BY Jacob Trachtman
ATTORNEY

June 14, 1966 W. G. EHRICH 3,256,389

SIGNAL PROCESSING SYSTEM AND METHOD

Filed June 30, 1960 2 Sheets-Sheet 2

INVENTOR.
WILLIAM G. EHRICH

BY Jacob Trachtman

ATTORNEY 3,256,389
Patented June 14, 1966

3,256,389

SIGNAL PROCESSING SYSTEM AND METHOD

William G. Ehrich, Haddonfield, N.J., assignor to General Atronics Corporation, Bala-Cynwyd, Pa., a corporation of Pennsylvania Filed June 30, 1960, Ser. No. 39,915
29 Claims. (Cl. 178—50)

Figure 1:
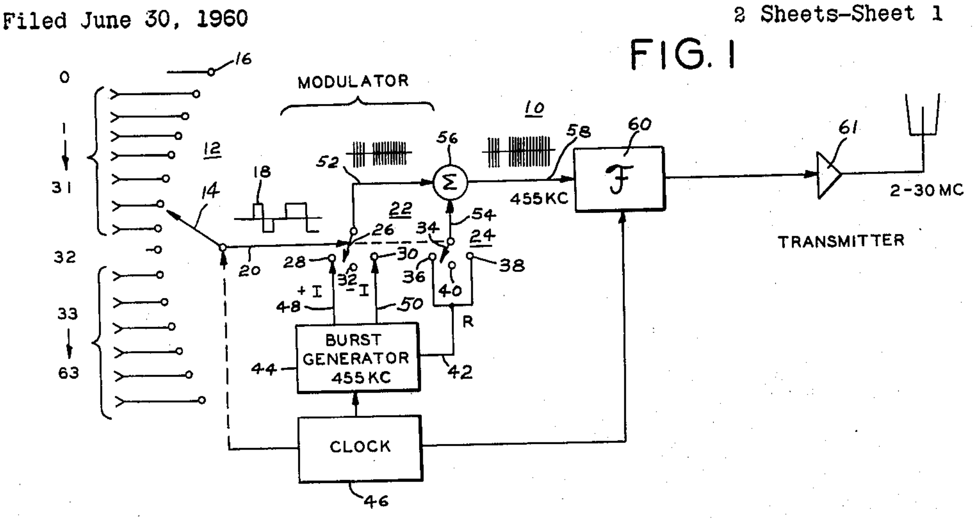

The invention relates to a signal processing system and method, and more particularly to a system and method for converting information signals occurring in time sequence to a signal comprising a plurality of spectral components respectively relating to the time-sequenced signals which may be especially useful in connection with multiplexing techniques.

Heretofore, apparatus has been utilized for multiplexing a plurality of time-sequenced information signals for transmission from one station to another. The present signal processing system and method may be utilized for receiving a plurality of sequential signals which may be derived from multiplexing sampling techniques or otherwise and transforming them to a composite signal comprising a plurality of spectral components relating to respective time-sequenced information signals. Such composite signals may be transmitted, received and retransformed to reproduce the sequence of timed information signals.

The system and method of the invention has the advantage of affording great flexibility in the number of channels utilized, and allows for redundant use of channels or non-use of intermediate channels for achieving greatest reliability in transmission of information in view of loss of information due to natural transmission phenomena or jamming conditions.

The system may use arbitrary band widths and arbitrary numbers of channels depending on requirements, thereby affording great versatility in its utilization.

The signal processing system illustrated comprises means for receiving a plurality of time-sequenced information signals with a common carrier frequency and respectively converting the carrier frequency of the time-sequenced signals in accordance with their occurrence within a predetermined time interval. Means are provided for receiving the converted signals from the converting means for delivering a composite output signal for transmission having concurrent spectral components each of which corresponds to a respective one of the time-sequenced input signals. Receiving means derives the composite output signal and converts the frequencies of respective components of the information signal. A means for sampling the converted signals delivers an output signal responsive to the particular spectral component with a predetermined converted frequency for providing respective time-sequenced information signals. Processing apparatus is provided for compensating for distortion produced in the information signal in its transmission to the receiving means.

The invention also includes the method of processing time-sequenced information signals occurring at a predetermined rate and each having a carrier frequency which comprises sampling time-sequenced information signals, storing the information signals sampled during a predetermined time interval, converting the carrier frequency of the stored signals as a function of time of their being sampled within said interval, combining said converted signals to provide a composite signal with concurrent spectral components equally spaced in frequency by a predetermined interval frequency within a predetermined frequency band with each of the spectral components corresponding to the time-sequenced information signals occurring within said interval. The method also provides for transmitting the composite signal, receiving and sampling signals received during a predetermined time interval, storing the sampled signals, producing the stored signals in time sequence during a compressed time interval, and periodically receiving and converting the frequencies of the spectral components by said interval frequency. The method further contemplates periodically sampling the converted signal and periodic delivery of an output signal responsive to a particular spectral component having a predetermined converted frequency for providing corresponding time-sequenced signals for each periodic sampling of said converted signals.

Figure 2:
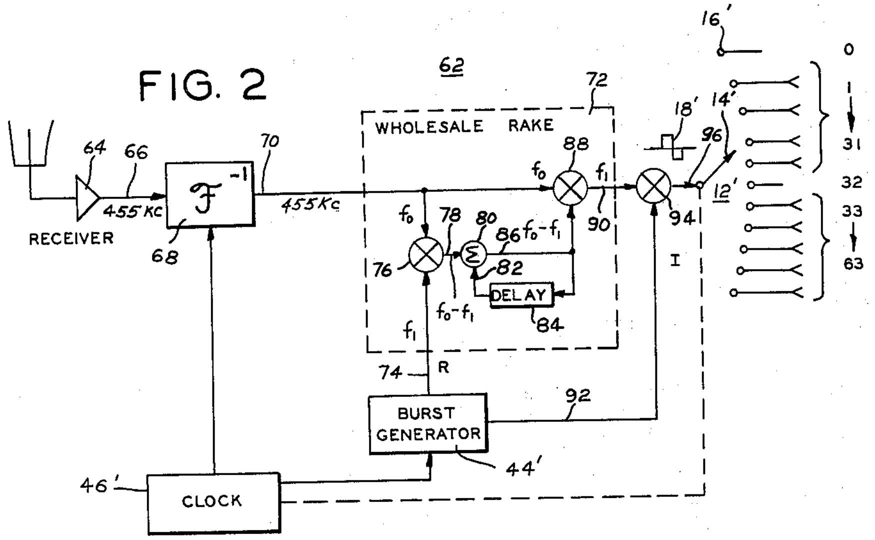
Figure 3:
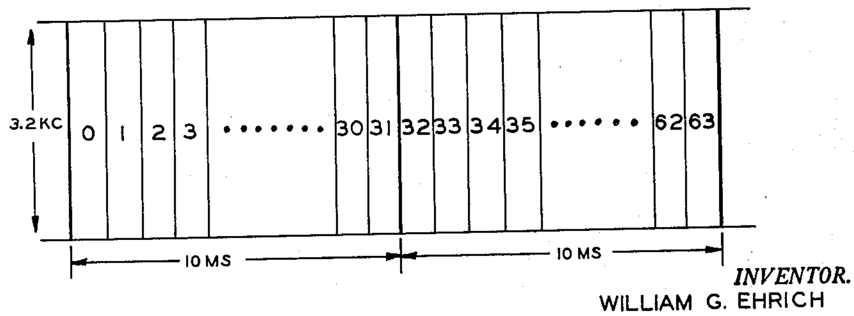
Figure 4:
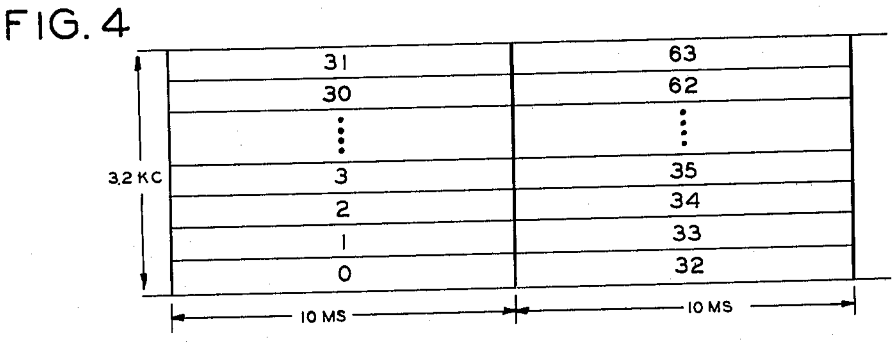
Figure 5:
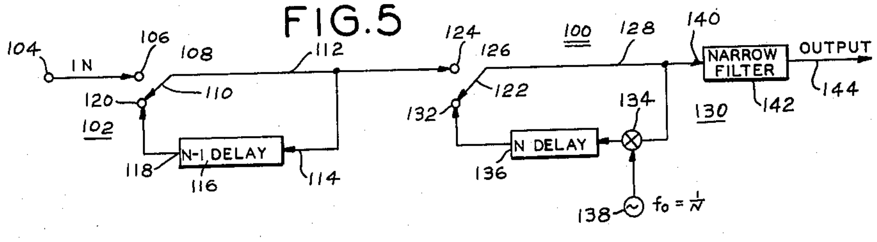
Figure 6:
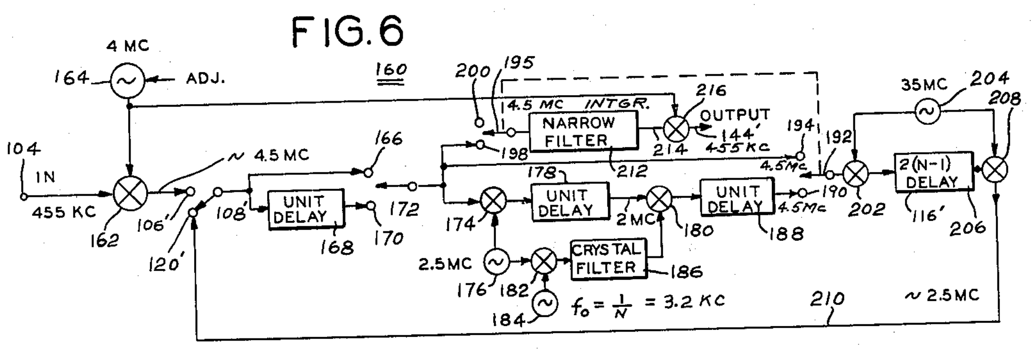

Referring now for greater detail to the drawings, the invention will be most readily understood from the following detailed description of a representative embodiment thereof, in which:

FIGURE 1 is a diagrammatic representation of a signal processing means for the transmitting portion of a teletype system embodying the invention, FIGURE 2 is a diagrammatic representation of a signal processing means for the receiving portion of said teletype system, FIGURE 3 diagrammatically illustrates the time division relationship of the output signals from the switching means of the signal processing means of FIGURE 1, FIGURE 4 diagrammatically illustrates the frequency division multiplexing of signals delivered by the output of the signal processing means of FIGURE 1, FIGURE 5 is a diagrammatic representation of the signal transforming means in simplified form of the processing means shown in FIGURES 1 and 2, FIGURE 6 schematically represents in greater detail a modified form of a signal transforming means in FIGURE 1 and 2, and FIGURES 7*a*, 7*b*, 7*c*, and 8*a*, 8*b*, 8*c* are respectively signal sampling and switching diagrams for the transforming means of FIGURES 5 and 6.

Like reference numerals designate like parts throughout the several views.

FIGURE 1 is a diagrammatic representation of a signal processing means 10 for the transmitting portion of a teletypewriter system.

The processing means 10 is provided with a multiplexing switch 12 including a plurality of 64 input terminals divided in two equal groups of 32 terminals respectively numbered 0 to 31 and 32 to 63. The sampling arm 14 of the switch 12 successively contacts each of the terminals 16 for sampling the signals delivered thereto. The terminals numbered 0 and 32 are not available to the operator for delivering teletypewriter input signals by plugging various telegraph channels into them as are the remaining 62 input terminals 16. The sampling means 12 samples each of the terminals 16 at a rate of 50 times per second for a period of 312.5 microseconds. Thus, the output of the switch is a time division multiplex signal with a bit rate of 3.2 kilocycles and a frame length of 20 milliseconds.

In the teletypewriter system each of the input lines 1–31 and 33–63 may receive independent input signals from respective teletypewriter channels. However, it may be desirable in certain circumstances to connect a number of input terminals 16 to a common information channel. This provides a redundancy which increases the reliability of the received information signal which may be especially important during bad transmitting conditions or in the presence of jamming signals. Similarly, alternate channels may also be left unused where this may be desired or required for increasing the reliability of the system under certain adverse conditions, while decreasing the number of channels utilized for transmitting information for the system.

In transmission of teletypewriter Mark and Space signals the baud characters may be respectively represented by positive and negative voltage signals of square configuration as shown at 18. The positive and negative signals sampled by the switch arm 14 are delivered to a pair of coupled electronic switching means 22 and 24. With the occurrence of a positive signal on line 20 representing a Mark signal, the switch 22 which is provided with a contact arm 26 engages the terminal 28, and engages the terminal 30 when a negative voltage or Space signal is present on the line 20. In the absence of a voltage signal, the arm 26 contacts the open terminal 32. The arm 34 of the switch 24 correspondingly engages the terminals 36 and 38 when positive and negative voltage signals are respectively present on the line 20, and contacts the open terminal 40 in the absence of a voltage signal on the line 20.

The terminals 36 and 38 of the switch 24 are connected to the output lead 42 of a burst generator 44 which delivers reference signal bursts R having a frequency of 455 kilocycles. The phase of the signal bursts delivered to the output line 42 by the generator 44 varies from burst to burst in a quasi-random manner. The generator 44 receives timing signals from a clock 46 which also times the switch 12 to provide synchronization.

The reference signal R on the line 42 of the burst generator 44 may be of the type generated by methods described on page 563 of the March 1958, Proceedings of the Institute of Radio Engineers, and illustrated on page 564 by FIGURE 8.

The burst generator 44 also delivers over line 48 an information signal I which is a signal burst having a frequency of 455 kilocycles and a phase leading the reference signal R by 90 degrees. The signal on line 48 is delivered to the terminal 28 of the switching means 22.

The burst generator 44 also provides an information signal —I to the terminal 30 of the switching means 22 over line 50. The information signal —I also has a frequency of 455 kilocycles but is inverted having a phase difference of 180 degrees from the information signal I on line 48, and lagging the phase of the reference signal R by 90 degrees.

The signals derived by the contact arms 26, 34 of the switching means 22, 24 are respectively delivered over lines 52, 54 to an adder 56 which delivers their sum over the line 58 to a signal transforming means 60.

Although the amplitudes of the signal bursts delivered by the generator 44 are constant and a particular phase relationship is established between concurrently delivered signal bursts, for the purpose of this illustration, the amplitudes of the signal bursts need not be constant nor is it required that the specific phase relationships between concurrent bursts be utilized in embodying the invention. For example, the input signals delivered to line 20 need not be of a binary character but may have amplitudes in the form of an analogue signal, while the burst signals delivered by the switching means 22, 24 may also be caused to respond to the amplitude of the signal on line 20 to provide corresponding signals.

Thus, when a positive Mark signal is sensed by the switching means 12, the adding means 56 delivers a signal to the transforming means 60 which is the addition of a reference signal R and an information signal I, while in the presence of a negative voltage or Space signal, a signal burst which is a combination of the reference signal R and the negative information signal —I is provided. In the absence of a Mark or Space signal on line 20, the adding means 56 delivers no signal to the transforming means 60.

The transforming means 60, which may be designated a Fourier transformer because of its transforming action, is timed by signals from the clock 46 and receives a plurality of signal bursts over line 58 for producing an output signal having spectral components respectively responsive to the received time-sequenced signals at its input. The transforming means 60 is described in greater detail below in connection with FIGURES 5, 6, 7 and 8. Suffice it to say, at this point, that the output signal produced by transforming means 60 consists essentially of successively occurring groups of spectral components, each group having a duration equal to the time required for switch 12 to sample one group of 32 input terminals (i.e. one-half frame interval, or 10 milliseconds). Each group consists of 32 individual spectral components, all occurring simultaneously, and representing respectively the information which was present at the above-mentioned 32 input terminals during one sampling thereof.

The output signal from the transforming means 60 is delivered to a transmitter 61 for modulating a carrier frequency of 2 to 30 megacycles for propagation through the ionosphere.

FIGURE 2 is a diagrammatic representation of the signal processing means 62 of the receiving portion of the teletypewriter system.

The propagated signal detected by the receiver 64 at the processing means 62 delivers a 455 kilocycle signal which is similar to the transmitted modulation signal at the transmitter 61 except for the affect of the propagating medium thereon. The detected signal comprises the plurality of spectral components delivered over the line 66 to a signal transforming means 68 which may be considered the inverse transformer of the Fourier transforming means 60.

The transforming means 68 similarly receives timing signals from a clock 46' while delivering an output signal on its line 70 comprising a plurality of time-sequenced signal bursts having a frequency of approximately 455 kilocycles, and corresponding to the spectral components of input signal to the transforming means 68.

The series of signal bursts delivered to line 70 is similar to the signal bursts on output line 58 of the adding means 56 of the processing means 10 of FIGURE 1. The signal bursts on line 70 of the processing means 62, however, may have been affected by the propagation medium. The effect of the propagation medium may be compensated for by the wholesale rake circuit 72. The circuit 72 receives the signals on line 70 and the reference signals R on output line 74 of the burst generator 44'. The burst generator 44' delivers identical reference signals R as the burst generator 44 of the processing means 10 at the transmitter, except that the signals on line 74 are delayed by the average delay in the signals propagated from the transmitter portion to the receiver portion of the teletypewriter system.

The wholesale rake circuit 72 includes a heterodyne multipler 76 mixing the signals on line 70 which may be referred to as having a frequency $f_0$ and the signal bursts on line 74 which have a frequency $f_1$. The multiplier 76 delivers an output on line 78 having a frequency $f_0-f_1$ which is the difference of the frequencies of the input signals as well as a phase which is the difference in the phase between said input signals. The signal on line 78 is delivered to an adder 80 which also receives signals on the output line 82 of a delay line 84. The sum of the signals delivered to the adder is delivered to the line 86 for receipt at the input of the delay line 84. The delay provided by the delay line 84 is equal to one-half the time required for the switching means 12 to sample all of the input terminals 16 of the processing means 10 at the transmitting portion of the system shown in FIGURE 1. The signal on line 86 is also delivered to a heterodyne mixer or multiplier 88 which also receives the signal on line 70 for producing an output signal having a frequency $f_1$ which is the difference in the frequencies of the input signals as well as a phase which is the difference of the phases of the input signals to the heterodyne multiplier 88.

The multiplier 88 delivers the output signal of the wholesale rake circuit 72 to its output line 90.

In operation, the signals delivered by the multiplier 76 provide signals which circulate in the loop comprising the delay line 84 and adder 80 and characterize the phase delay and amplitude change in the received signals due to the characteristic effect of the propagating medium for each of the respective spectral components of the transmitted signal.

As will be evident with the further description of the system, the position of each of the signal bursts on line 70 within the frame time interval of the processing means results in the transmission of the information signal as a particular spectral component in the composite signal transmitted through the propagating medium, so that each signal burst is affected by the characteristics of the medium for a particular respective frequency component corresponding to its said position. The signals circulating in the delay network or line 84 can therefore represent the characteristics of respective frequency components, the position of each such signal corresponding to a particular characteristic for its particular related propagation frequency. Since a frame is divided into two sections each of which is in turn sequentially transformed by the Fourier transforming means 68, a delay time for the delay line 84 of one-half the frame interval is all that is required to obtain all the information with respect to the entire spectrum of signal components propagated through the atmosphere or ionosphere. By mixing the signals circulating in the delay network 84 with the corresponding signal delivered to line 70, the effect of the propagating medium on the received signal burst is compensated for, to produce an output signal on line 90 similar to the corresponding signal bursts delivered over line 58 of the transmitting portion of the teletypewriter system shown in FIGURE 1.

The burst on line 90 from the wholesale rake circuit 72 is correlated with the information signal I delivered on line 92 which has been delayed to correspond to the average propagation delay for the received signals, by delivering these signals to the input of a heterodyne mixer 94. The heterodyne mixer 94 delivers a positive signal or a negative signal depending upon whether the input burst on line 90 corresponds to a Mark or Space signal as represented at 18'.

The wholesale rake circuit 72 is similar to a portion of the circuit shown in FIGURE 8 of U.S. patent application, Serial No. 819,374 filed by co-inventors, David E. Sunstein and Bernard D. Steinberg on June 10, 1959, entitled, "Signal Processing Apparatus and Method."

The signals on the output line 96 of the multiplier 94 are delivered to the contact arm 14' of a signal distributing or multiplexing switch 12' similar to the switching means 12 of the transmitting portion of the processing means 10 shown in FIGURE 1. The contacting arm 14' sequentially engages the terminals 16' of the switching means 12' at the same rate as the switching means 12 and is synchronized by signals from the clock 46'.

The output signals delivered to the respective terminals 16' numbered 0 to 63 correspond to the input signals delivered to the respectively numbered terminals of the switching means 12 of the transmitting portion of the system shown in FIGURE 1.

FIGURE 3 schematically discloses the time division arrangement for sampling the input terminals of the switching means 12, wherein the sampling frame interval extends for 20 milliseconds and is divided into equal subsections of 10 milliseconds. The frequency spectrum of each sampled signal is 3200 cycles per second. The FIGURE 3 also exemplifies the signal distributing timing of the synchronized output switching means 12' in which 63 signals of 312.5 microseconds' duration are sequentially delivered to each of the output terminals 16', each such signal having a frequency spectrum of 3200 cycles per second.

FIGURE 4 is a diagrammatic representation of the frequency component multiplexing achieved by the transforming means 60 of FIGURE 1, wherein each of the 32 samples of a half frame interval occurring over ten milliseconds is transformed into a composite signal extending over 10 milliseconds and comprising 32 concurrent spectral components, each component being separated by an interval frequency of 100 cycles, providing a total frequency band of 3200 cycles per second.

The second series of 32 samples numbered 32 to 63 provides a sequential composite signal having a duration of 10 milliseconds comprised of spectral components within a band of 3200 cycles per second. Each of the spectral components is separated from the other adjacent components within the band by 100 cycles per second, while the first numbered spectral component has a frequency identical to that of the component numbered 33 and the components numbered 2 and numbered 34 have the same spectral component within the composite signal illustrated in FIGURE 4. The remaining numbered components of the first composite signal of 10 milliseconds' duration has a similar correspondingly numbered component of like spectral frequencies.

The transformation from the signal form shown in FIGURE 3 to that shown in FIGURE 4 is accomplished by the Fourier transforming means 60 of FIGURE 1, while the transformation of composite signals shown in FIGURE 4 to the sequential signal bursts shown in FIGURE 3 is provided by the inverse Fourier transforming means 68 shown in FIGURE 2.

The Fourier transforming means 60 and 68 may be identical providing that the signal frequency components delivered by the transforming means 60 are inverted in frequency before being delivered to the identical transforming means 68. This may be accomplished by modulating the transmitter carrier frequency by the composite output signals from the transformer 60 to provide upper and lower side bands and detecting the lower side band signals at the receiver 64 for producing the composite signals delivered to the Fourier transforming means 68 at the processing means 62 at the receiving portion of the system.

Therefore, the description of the transforming means 60 may be applied to the description of the inverse transforming means 68 with the above conditions in mind.

FIGURE 5 is a diagrammatic representation in simplified form of a transforming means 100 corresponding to the transforming means 60 of FIGURE 1. The transforming means 100 comprises a signal time compressing means 102 having an input terminal 104 joined to the terminal 106 of the sampling switch 108. The contact arm 110 of the switch 108 is connected by line 112 to the input 114 of a delay line 116 which has its output 118 connected to a second terminal 120 of the switch 108. The delay line 116 is provided with a total delay of 302.7 microseconds which is equal to N–1 unit delays, wherein N equals 32 and each unit delay is 9.8 microseconds. A unit delay is equal to the sampling period of switch 108 for each of the signal bursts illustrated in FIGURE 3.

The arm 110 of switch 108 periodically contacts the terminal 106 to sample the input signal on terminal 104 which may be derived from the line 58 of FIGURE 1. The arm 110 contacts the terminal 106 for approximately 9.8 microseconds while it contacts its second terminal 120 for the remaining time of the 312.5 microsecond period during which each information signal is presented to the input terminal 104 of the transforming means 100. Since the delay period of the line 116 is one unit delay less than the total sampling time during which a half frame of signals are sampled, a new sampled signal is added to the end of the series of signals circulating through the loop containing the delay line 116 with each sampling, while the oldest signal is lost due to the fact that the arm 110 of switch 108 is not contacting the terminal 120 during this time.

When, for example, all of the signals in an interval corresponding to a half frame, or 10 milliseconds (FIGURE 3), have been sampled by the switch 108, the arm 122 of switch 126 engages the terminal 124 for 312.5 microseconds for delivering this compressed signal to the line 128 of the signal converting means 130.

It is noted that the action of the means 102 time compresses the signals circulating through the delay line 116 during a total period of 312.5 microseconds. The arm 122 of switch 126 then disengages the terminal 124 and contacts the terminal 132 completing a loop over line 128 through a heterodyne multiplier 134 and a delay line 136. The delay of the delay line 136 is equal to N unit delays or 312.5 microseconds for circulating 32 compressed signal bursts.

Upon the engagement by arm 122 of contact 124 of the switch 126, the multiplier 134 is provided with an alternating signal by oscillator 138 having a frequency $f_0$ which is the reciprocal of the total time of N unit delays. Thus, the frequency of the local oscillator is equal to the reciprocal of the delay of the loop of converting means 130. The heterodyne multiplier or mixer 134 acts as a variable phase shifter going through one complete cycle for each 32 signal bursts. This has the effect of shifting the frequency of each of the input bursts as a function of its position within the group of 32 signal bursts received. Thus, the first signal burst is provided with zero phase shift and maintains its original burst frequency, while the following signal bursts each have an increase in carrier frequency equal to the frequency interval between bursts of 100 cycles while the last occurring signal burst (numbered 31 or 63) of the semi-frame interval is provided with the maximum change of frequency $f_0$.

The signals thus received by the delay line 136 and circulating in the loop of the converting means 130 comprise a plurality of burst signals each with a carrier frequency differing from its preceding burst signal by a predetermined interval frequency of 100 cycles per second.

The converted signal bursts are sequentially delivered to the input 140 of a narrow band filter 142 of high Q. The filter 142 accumulates the presented signals with the repeated presentations provided by their circulation about the converter loop. Each of the signals presented at the input 140 of the narrow band filter within the 3200 kilocycle band is accumulated and concurrently presented at the output 144. The output signal of filter 142 thus comprises a composite signal having a plurality of spectral components corresponding to the time-sequenced burst signals received at the input 104 of the converting means 100 and is represented by FIGURE 4.

Such signals on the output 144 are presented to the transmitter 61 of FIGURE 1 for modulating a high frequency carrier signal for propagation through the atmosphere or ionosphere.

It is noted that during the time interval of 10 milliseconds that a composite signal is delivered to the output 144 of the processing means 100, a series of 32 successive signals are presented to the input terminal 104 and sampled by the switch 108 to provide a compressed time-sequenced series of signals for presentation to the terminal 124 for loading the loop of the converting means with the new succeeding group of burst signals for conversion and deliveries as a composite signal at the output line 144 during the next semi-frame interval of 10 milliseconds.

The processing means 100 thus proceeds by receiving at its input 104 time-sequenced burst signals of a common carrier frequency, but with different phases and where desired with different amplitude modulations for providing a composite output signal on the line 144. This action takes place in a continuous manner by the compressing action of the circuit 104 which allows the continuous presentation of successive 10 millisecond output signals on line 144 during the time required for sampling input signals at terminal 104.

It is important that for increased efficiency the phases of the input signals are arbitrary, so that the probability will be small that the phases of the spectral components of the composite signal delivered at the output line 144 will not add to provide a sharp pulse signal during the 10 millisecond time interval of the signal, since this requires a high power output from the transmitter. The arbitrary phases of the input signals generally result in an output signal which will not be sharply peaked and thus will allow the delivery of average power by the transmitter over the entire 10 millisecond signal period.

The signal transforming means 100 is used to provide the inverse function when the transforming means 68 shown in FIGURE 2 is identical to the means 60 of FIGURE 1, by deriving an input signal from line 66 of the receiver 64 of FIGURE 2 with its frequency spectrum inverted as previously described. The composite signal from line 66 is delivered to the input terminal 104 and has a duration of 10 milliseconds. During this period of time, the switch 108 takes 32 samples providing a time compressed signal which upon the taking of the last sample by switch 108 is sampled by the switch 126 delivering the compressed signal to the line 128. The filter 142 which is tuned to respond to the spectral component of the highest frequency of the compressed signal, delivers an output signal having a carrier frequency of this highest spectral component and the phase present therein. Since the other frequency components in the signal delivered to line 28 have incrementally lower frequencies, they do not contribute to the output signal on line 144.

The local oscillator 138 which continuously delivers its signal to the multiplier 134 increases by the interval frequency of 3200 cycles per second the frequency of the spectral components present in the compressed signal circulating through the delay line 136 of the loop of the converting means 130. After the first passage through the delay line 136, the signal is again presented to the input 140 of the filter 142 which now samples the spectral component which has been increased to the band pass frequency of the filter 142, and provides a corresponding output signal of this frequency having the phase information present therein. As the process continues, the filter 142 sequentially samples the various spectral components present in the input signal to terminal 104 as they are increased in frequency by the heterodyne multiplier 134 with each circulation about the loop of the converting means 130. After 32 such circulations, the narrow band filter 142 will have presented corresponding output signals in the presence of respective spectral components which are provided in time sequence order and with a common carrier frequency including the phase information present in the input signal at the terminal 104.

Since the frequencies of the input signals have been inverted when presented to the input terminal 104 as previously explained, the highest frequency which is sampled first by the filter 142 corresponds to the lowest frequency spectral component of the composite signal delivered by the transforming means 60 of FIGURE 1 responsive to the first signal burst. This inversion of spectral components allows the narrow band filter 142 to deliver its time-sequenced output signals in the same order in which they are presented at the input 58 of the transformer 60. Thus, the signals delivered from the output 144 of the transformer 68 in the receiving portion of the system correspond directly in the proper sequenced order to the signals presented to the transforming means 60 of the transmitter.

In the event that the frequency componnts from the transmitter are not inverted as described, a similar result may be achieved by tuning the filter 142 to the lowest frequency component of the composite signal being processed and periodically decreasing rather than increasing each of the spectral components of the signal circulating in the loop of the converting means 130 with each circulation through the delay line 136.

The FIGURES 7 and 8 are signal sampling and timing diagrams illustrating the operation of the signal transforming means 100 of FIGURES 5 and 6.

Figures 7A, 7B, 7C, 8A, 8B, 8C:
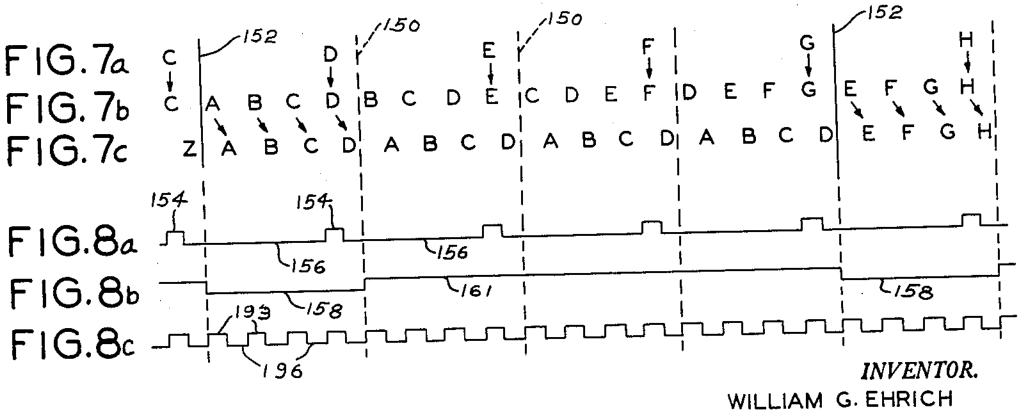

The FIGURE 7*a* illustrates the samples C, D, E, F, G, and H which are sequentially delivered to the input terminal 104 during the time intervals provided by the vertical dashed lines 150 each having a duration of 312.5 microseconds. The vertical lines 152 indicate the division of FIGURE 7 into semi-frame intervals and four sample signals are utilized for each half interval period with a frame of 8 total signals, for illustration in simplified form. Of course, the frame of 64 signals with the half time interval of 10 milliseconds utilized by the illustrated embodiment has been simplified for clarity of description in FIGURES 7 and 8.

FIGURE 8*a* shows the switch means 108 in its "up" position at 154 contacting the terminal 106 for sampling an input signal at terminal 104 and at its down position at 156 engaging its terminal 120 for receiving circulating signals.

FIGURE 7*b* shows the four signals circulating in the time compressing loop of the means 102 of the processing means 100, with the oldest signal represented in the last place replaced by the newest signal sampled by the switch 108. Thus, during the first complete sampling time shown in FIGURE 7 beginning at the vertical line 152 the signals A, B, C and D are present in the compressing means 102 and in successive time intervals a new signal is added so that in the fifth time interval starting the second half of the frame, a completely new set of signals E, F, G and H is circulating in the compressing means 102.

FIGURE 8*b* is a timing diagram for the switching means 126 illustrating the switch in contact with the input terminal 124 at 158, and contacting the terminal 132 at 161. During the sampling interval during which the switch 126 contacts the terminal 124, the signals delivered from the compressing means 102 to the terminal 124 are received by the signal converting means 130 as illustrated in FIGURE 7*c*. The signals received during this time, A, B, C and D illustrated in the first sampling interval, are retained by the converting means 130 for the four sampling periods of the semi-frame interval as seen from FIGURE 7*c*. A new group of signals E, F, G and H are received at the beginning of the second half of the frame interval. Each of these groups of signals, e.g. the group comprising signals A, B, C and D is then transformed, by interaction with oscillator 138 in the manner previously described in explaining FIGURE 5, into a corresponding series of signals which are not only at different time positions, but also at different frequencies. All of these signals are then stretched in time, by means of narrow band filter 142, as also previously explained, so that, at the output of this filter, they are no longer in time sequence but occupy substantially concurrent periods of time. The different signals remain distinguishable from each other, not through being at different positions, in time, as in FIGURE 7*c*, but through being at different positions in the frequency spectrum as shown in FIGURE 4. The remaining FIGURE 8*c* illustrates the switch timing connection with the transforming means 160 illustrated in FIGURE 6.

The signal transforming means 160 of FIGURE 6 is a modified form of the transforming means 100 in which the loops of the means 100 are combined to provide an interlaced signal arrangement for utilizing one major delay line 116' having a delay of $2(N-1)$ unit delays. In FIGURE 6, a unit delay is approximately 4.9 microseconds.

The signals delivered to the input terminal 104 having a frequency of 455 kilocycles are heterodyned in a multiplier 162 receiving a frequency of 4 megacycles from a generator 164 for producing an output signal with a frequency of approximately 4.5 megacycles. The 4.5 megacycle signal is delivered to the sampling terminal 106' of the switch 108' which operates like switch 108 in accordance with the timing diagram illustrated in FIGURE 8*a*. The signals sampled by switch 108 are respectively delivered directly to the terminal 166 and through a unit delay line 168 to the terminal 170 of a sampling switch 172. The sampling switch 172 operates in accordance with the timing diagram of FIGURE 8*b* to normally contact the terminal 166 during the time shown at 161, while contacting the terminal 172 at the times 158.

The signals received by the switch 172 when it contact with the terminal 170 are heterodyned by a mixer 174 with a frequency of 2.5 megacycles from a generator 176 for providing an output signal with the frequency of 2 megacycles. This signal after passing through a unit delay line 178 is delivered to a multiplier 180 which also receives the signal having a frequency which is increased by 3.2 kilocycles over 2.5 megacycles. This signal is derived by heterodyning the signal from the generator 176 in a multiplier 183 with a 3.2 kilocycle signal from a generator 184 and passing the resulting signals through a narr w band crystal filter 186 tuned to the upper frequency side band. The output from the multiplier 180 is therefore a signal of 4.5 megacycles which has been increased by 3.2 kilocycles. Because of the small relative increase in frequency the above method is utilized in order to obtain accurate increase in the frequency of the 4.5 megacycle signals delivered to the terminal 106' of the switch 108'.

The signal from the multiplier 180 then passes through the unit delay 188 to the terminal 190 of a switch 192, while the terminal 194 of the switch receives signals directly from the contact arm of the switch 172.

The switch 192 which acts in synchronization with a switch 195 contacts the terminal 190 at the times 196, shown in the timing diagram of FIGURE 8*c* while contacting the terminal 194 at the times 193. Similarly, the contact arm of switch 195 engages the terminal 198 which is connected to the terminal 124 at the times 196, while engaging the open terminal 200 during the times 193 illustrated by FIGURE 8*c*.

The signal delivered by the switch 192 is heterodyned in a mixer 202 with a signal from a local oscillator generator 204 for providing a signal at a higher frequency best adapted for passage through a delay line 206. The delay line has a delay of $2(N-1)$ unit delays or 307.6 microseconds. The signal from the delay line 206 is again heterodyned in a mixer 208 for changing its frequency to approximately 2.5 megacycles. This signal is delivered over return line 210 to the terminal 120' of the switch 108' for circulation in the time compressing loop.

The signal on terminal 198 is also periodically delivered to switch 195 to the input of the narrow band filter 212. The narrow band filter 212 acts as a signal integrator for the spectral signal frequencies at approximately 4.5 megacycles which are delivered at its output 214 to a heterodyne multiplier 216. The multiplier 216 also receives 4 megacycle signals from the local oscillator 164 so that the output signals from the multiplier 216 are delivered to the output line 144' with a frequency of 455 kilocycles.

The FIGURES 7 and 8 apply to the signal transforming means 160 for illustrating its sampling procedure and the timing of its switches as stated in the above description of the means 160.

With this in mind, it is noted that the signals delivered to the input terminal 104 of means 160 are periodically sampled by the input switch 108'. With the switches 172 and 192 also in their up positions, the signal samples are delivered from switch 108' directly to the multiplier 202 for passage through the delay line 116'. After each sampling by switch 108', the switch 192 returns to its downward position allowing the signal received at its terminal 190 to be received by the delay line 116'.

The switch 192 which is in its down position during the previous sampling step of switch 108' alternately moves up and down between its terminals 190, 194 as shown by the FIGURE 7*c* for receiving signals alternately present at these terminals. In this connection, it is noted that signals which are present at the terminal 194 when switch 192 is in contact therewith are sampled signals which replace the oldest sample taken in the signal time compressing loop of the transforming means 160.

The switch 172 moves up and down in accordance with the timing diagram of FIGURE 8*b* contacting terminal 166 at times 161 and terminal 170 at times 158. Thus, when a new group of 4 signal samples have been time compressed in the time compressing loop of the transforming means 160, the switch contacts the terminal 170 receiving the set of pulses circulating through the delay 116' which are shifted one pulse period as shown in FIGURES 7*b* and 7*c* by the unit delay line 168. Due to the switching action of the switch 192, the newly delivered sample signals will now be processed through the multipliers 174 and 180 and picked up at the terminal 190 for circulation in the converting means.

It is noted that the signals in the frequency converting loop pass through a total delay of 2 N by the additional unit delays 116', 178 and 188. The signals circulating in this loop are interlaced with the signals being collected in the adjacent time intervals by the compressing action of the means 160. The signals newly sampled which are collected and compressed in the alternate signal spaces upon the completion of their collection are shifted by one unit delay into the positions where they will be acted upon by the converting means of the transformer means 160.

Since the switch 195 acts in synchronism with the switch 192, it is also periodically samping the signals in the converting loop presented at the terminal 198 and delivers an output signal to the line 144' through the multiplier 216.

The transforming means 160 thus operates by interlacing the signals being sampled and compressed with the signals being converted for utilizing a single main delay line 116' with a delay of $2N-2$ unit delays.

It will be obvious to those skilled in the art that the invention may find wide application with appropriate modification to meet the individual design circumstances without substantial departure from the essence of the invention.

What is claimed is:

1. A signal processing means comprising an input terminal for receiving a plurality of time-sequenced information signals, a time compressing means for storing the signals received by said input terminal, and means for receiving the time compressed signals from said compressing means and converting to different respective frequencies the frequencies of different ones of said time-sequenced information signals.

2. A signal processing means comprising an input terminal for receiving a plurality of time-sequenced information signals with a common carrier frequency, a time compressing means for storing the signals received by said input terminal in time-sequenced relationship, and means for receiving the time compressed signals from said compressing means and converting the frequency of each of said information signals.

3. A signal processing means commprising an input terminal for receiving a plurality of time-sequenced information signals, a time compressing means for storing the signals received by said input terminal, means for receiving the time-compressed signals from said compressing means and converting the frequency of each of said information signals, and means receiving signals from said converting means for delivering an output signal having spectral components each of which corresponds to a respective one of said time-sequenced signals.

4. A signal processing means comprising an input terminal for receiving a plurality of time-sequenced information signals with a common carrier frequency, a time compressing means for storing the signals received by said input terminal in time sequenced relationship, means for receiving the time compressed signals from said compressing means and converting the frequency of each of said information signals, and means receiving signals from said converting means for delivering an output signal having spectral components each of which corresponds to a respective one of said time-sequenced signals.

5. A signal processing means comprising means for receiving a plurality of time-sequenced information signals with a common carrier frequency, a time compressing means for storing the signals received by said input terminal in time-sequenced relationship, means for receiving the time compressed signals from said compressing means and respectively converting the carrier frequencies of said time-sequenced signals to predetermined carrier frequencies, and means receiving said converted signals from said converting means for delivering an output signal having spectral components each of which corresponds to a respective one of said time-sequenced input signals.

6. A signal processing means comprising: an input terminal for receiving a plurality of time-sequenced information signals with a common carrier frequency; a time compressing means for storing in time-sequenced relationship the signals received during a time interval by said input terminal, said time compressing means comprising a sampling means periodically sampling the signals received by said input terminal and signal storage means receiving periodic signal samples from said sampling means, said sampling means comprising a signal switching device having a first input connected with said input terminal, a second input and an output and said signal storage means comprising a delay line having an input connected with the output of said switching device and having an output connected with said second input of said switching device, said switching device normally deriving signals from its second input and periodically obtaining sample signals from its first input; and means for receiving the time compressed signals from said compressing means stored during a predetermined time interval and converting the carrier frequencies of said time-sequenced signals in accordance with the occurrence of said time-sequenced signals within said predetermined time interval to predetermined carrier frequencies, each of the carrier frequencies of said information signals being converted by incrementally changing the carrier frequencies of said information signals as a function of the position of said signals within said predetermined time interval, said last-named means including means receiving converted signals and delivering a composite output signal for each of said time intervals having concurrent spectral components each of which components corresponds to a respective one of said time-sequenced input signals occurring during each of said predetermined time intervals.

7. The processing means of claim 6 in which said last means converts each of the carrier frequencies of said information signals by incrementally increasing the carrier frequencies of said information signals with the later occurring ones of said signals having a converted carrier frequency greater than the converted carrier frequencies of the earlier occurring information signals within said time interval.

8. The processing means of claim 6 in which said last means converts each of the carrier frequencies of said information signals by incrementally decreasing the carrier frequencies of said information signals with the earlier occurring ones of said signals having a converted carrier frequency greater than the converted carrier frequencies of the later occurring information signals within said time interval.

9. The processing means of claim 6 in which said last means comprises an integrator receiving the converted signals from said converting means in time sequence and storing said signals until all of the signals within a predetermined interval have been integrated for delivering an output signal concurrently including each of said integrated converted signals.

10. The processing means of claim 9 in which said integrator comprises a narrow band filter network.

11. The processing means of claim 9 in which said first means for receiving a plurality of time-sequenced information signals with a common carrier frequency comprises a delay line providing a predetermined delay interval.

12. The processing means of claim 11 in which said first means includes a signal heterodyning circuit for converting the carrier frequencies of said information signals as a function of position within said time interval.

13. A signal processing device comprising means for receiving an information signal having a plurality of concurrent spectral components equally spaced in frequency by a predetermined interval frequency within a predetermined frequency band, means for periodically converting said information signal by changing the frequencies of said spectral components of said information signal by said interval frequency, and means for periodically sampling said converted signal and delivering an output signal responsive to a particular spectral component with a predetermined converted frequency to provide corresponding time-sequenced signals for respective components of said information signal.

14. The processing device of claim 13 in which said converting means periodically increases the frequency of each of the spectral components of said information signal for providing time-sequenced output signals by said sampling means with the output signals occurring later in time corresponding to spectral components of lower frequency of said information signal.

15. The processing device of claim 13 in which said converting means periodically decreases the frequency of each of the spectral components of said information signal for providing time-sequenced output signals by said sampling means with the output signals occurring later in time corresponding to spectral components of higher frequency of said information signal.

16. A signal processing means including a pulse generator concurrently providing time-sequenced reference and information signal bursts having a common frequency with the phase of said reference bursts generated in a quasi-random manner, a selecting means delivering information bursts from said generator responsive to an information input signal, and a transforming means receiving a series of bursts from said selecting means during a predetermined time interval and delivering an output signal having concurrent spectral components each of which corresponds to a respective one of said series of information bursts.

17. A signal processing system including a pulse generator concurrently providing time-sequenced reference and information signal bursts having a common frequency with the phase of said reference bursts generated in a quasi-random manner, a selecting means delivering information bursts from said generator responsive to an information input signal, a transforming means receiving a series of bursts from said selecting means during a predetermined time interval and delivering an output signal having concurrent spectral components each of which corresponds to a respective one of said series of information bursts, means for transmitting said output signal, means receiving said output signal and delivering time-sequenced information signals each corresponding to a respective one of the spectral components of said information signal, and processing apparatus receiving said reference signal burst for correlating with said information signals to obtain an output signal.

18. A signal processing means comprising a signal time compressing means including a terminal for receiving signals, switching means for periodically sampling signals received by said terminal, delay means having an input receiving said signals sampled by said input terminal and an output delivering signals to its input except when said input is receiving a signal from said terminal; a signal converting means comprising a switching means for periodically sampling signals received by the input of the delay means of said compressing means, delay means having an input receiving said signals sampled by said switching means and an output delivering signals to its input except when said input is receiving a sampled signal from said switching means, and means for periodically converting the frequencies of the signals circulating through said delaying means; and sampling means periodically sampling said signals circulating through the delay means of said converting means for delivering periodic output signals responsive to the respective spectral components of the signal received by the input terminal of said compressing means.

19. In a communication system: means for translating a signal having a plurality of time-sequenced components respectively representing different information; means for translating a signal having a plurality of substantially concurrent frequency spectral components respectively representing said different information represented by said time-sequenced components; and means coupled between said translating means and responsive to one of said signals to transform it into the other.

20. The apparatus of claim 19 characterized in that said signal responsive means comprises a Fourier transforming means.

21. The apparatus of claim 19 characterized in that said signal responsive means comprises means for time-compressing said one signal, means for heterodyning said time compressed signal repeatedly with an auxiliary signal, and means for accumulating heterodyne components produced by said heterodyning means.

22. A signal processing means comprising means for sampling a plurality of information signals in recurrent sequence to produce a time-sequenced series of samples of said information signals, means for converting said samples to samples having a common carrier frequency and having a phase which varies in accordance with the information represented by said signal samples, and means receiving said converted signals from said converting means for delivering an output signal having spectral components each of which corresponds to a respective one of said time-sequenced samples.

23. The signal processing means of claim 22 further comprising means for combining with said samples having a common carrier frequency a signal of said frequency and of reference phase.

24. A signal processing system comprising: means for developing time-sequenced information signals having a common carrier frequency; first means for heterodyning said signals with a reference carrier; means for recirculating via a delay line one of the heterodyne components produced by said heterodyning means; and second means for heterodyning said recirculated component with said information signals from said developing means.

25. The signal processing system of claim 24 further characterized in that said developing means comprises means for producing an information signal having a plurality of spectral components, and means for transforming said spectral components into time-sequenced signals each corresponding to a respective one of said spectral components.

26. The signal processing system of claim 24 further characterized in that said heterodyne component derived from one of said heterodyning means is the sum frequency component and in that the heterodyne component derived from the other of said heterodyning means is the difference frequency component.

27. The signal processing system of claim 26 further comprising third means for heterodyning a heterodyne component derived from said second heterodyning means with a signal derived from said reference carrier.

28. The system of claim 27 further comprising means for deriving from said third heterodyning means the difference frequency heterodyne component produced by said means.

29. A signal processing means comprising means for receiving a plurality of time-sequenced information signals with a common carrier frequency and converting said signals by incrementally changing the carrier frequencies of respective ones of said information signals as a function of the positions of said signals within a predetermined time interval, said receiving means comprising a delay line providing a predetermined delay interval and a signal heterodyning circuit, and means receiving said converted signals for delivering a composite output signal having concurrent spectral components each of which corresponds to a respective one of said time-sequenced information signals, said last named means comprising an integrator receiving said converted signals in time-sequence and storing said signals until all of the signals within said predetermined interval have been integrated for delivering an output signal concurrently including each of said integrated converted signals.

References Cited by the Examiner

UNITED STATES PATENTS

| | | | |
|---|---|---|---|
| 1,624,596 | 4/1927 | Harley | 179—15 |
| 1,805,867 | 5/1931 | Compare | 178—66 |
| 2,058,398 | 10/1936 | Bear | 178—66 |
| 2,101,421 | 12/1937 | Specker | 178—66 |
| 2,658,942 | 11/1953 | Durkee | 178—66 |
| 2,705,795 | 4/1955 | Fisk et al. | |
| 2,794,854 | 6/1957 | Boughtwood | 178—66 |
| 2,897,269 | 7/1959 | Alphenaar et al. | 178—88 |
| 3,939,913 | 6/1960 | Durkee | 178—66 |
| 2,954,436 | 9/1960 | Maniere et al. | 178—88 |

DAVID G. REDINBAUGH, *Primary Examiner.*

NEWTON N. LOVEWELL, *Examiner.*

A. J. DUNN, J. P. MOHN, S. J. GLASSMAN, *Assistant Examiners.*